United States Patent
Shulman et al.

(10) Patent No.: US 8,056,141 B2
(45) Date of Patent: Nov. 8, 2011

(54) METHOD FOR MONITORING STORED PROCEDURES

(75) Inventors: Amichai Shulman, Tel Aviv (IL); Tal Ryterski, Ramat-Gan (IL)

(73) Assignee: Imperva, Inc., Foster City, CA (US)

( * ) Notice: Subject to any disclaimer, the term of this patent is extended or adjusted under 35 U.S.C. 154(b) by 1026 days.

(21) Appl. No.: 11/854,641

(22) Filed: Sep. 13, 2007

(65) Prior Publication Data
US 2008/0065640 A1    Mar. 13, 2008

Related U.S. Application Data

(60) Provisional application No. 60/844,096, filed on Sep. 13, 2006.

(51) Int. Cl.
*G06F 7/04* (2006.01)
(52) U.S. Cl. .................. 726/27; 707/769; 707/783
(58) Field of Classification Search .......... 726/27; 707/3, 759, 769, 781, 999.102
See application file for complete search history.

(56) References Cited

U.S. PATENT DOCUMENTS

| | | | |
|---|---|---|---|
| 5,572,673 A * | 11/1996 | Shurts | 726/17 |
| 6,038,563 A * | 3/2000 | Bapat et al. | 1/1 |
| 6,507,834 B1 | 1/2003 | Kabra et al. | |
| 6,769,074 B2 | 7/2004 | Vaitzblit | |
| 7,082,455 B2 | 7/2006 | Hu et al. | |
| 7,085,780 B2 | 8/2006 | Sakamoto et al. | |
| 7,155,641 B2 * | 12/2006 | Prang et al. | 714/47.1 |
| 7,640,235 B2 | 12/2009 | Shulman et al. | |
| 7,685,194 B2 * | 3/2010 | Kabra et al. | 707/719 |
| 7,743,420 B2 | 6/2010 | Shulman et al. | |
| 7,752,662 B2 | 7/2010 | Shulman et al. | |
| 7,797,339 B2 * | 9/2010 | Chase | 707/781 |
| 2004/0162822 A1 | 8/2004 | Papanyan et al. | |
| 2004/0162825 A1 * | 8/2004 | Bhaghavan et al. | 707/5 |
| 2005/0108188 A1 * | 5/2005 | Santosuosso | 707/1 |
| 2006/0136493 A1 | 6/2006 | Muralidharan et al. | |
| 2006/0271511 A1 * | 11/2006 | Harward et al. | 707/2 |
| 2006/0272008 A1 | 11/2006 | Shulman et al. | |
| 2007/0124806 A1 | 5/2007 | Shulman et al. | |
| 2007/0282837 A1 * | 12/2007 | Klein | 707/7 |
| 2007/0294539 A1 | 12/2007 | Shulman et al. | |

(Continued)

OTHER PUBLICATIONS

Gartner IT Security Summit, Imperva Delivers First True Gigabit Application Firewall Solution, News & Events, Press Release, http://web.archive.org/web/20060312094936/www.imperva.com/company/news/2005-jun-06.html, Imperva Inc., Jun. 6, 2005, pp. 3, Washington, DC, USA.

(Continued)

*Primary Examiner* — Nabil El Hady
(74) *Attorney, Agent, or Firm* — Sughrue Mion, PLLC

(57) ABSTRACT

A method for monitoring stored procedures is disclosed. The method performs on-line and inline monitoring of stored procedures for detecting table access operations performed by the procedures. This allows the enforcing of access control policies, correlation rules and audit rules on stored procedures. The monitoring is performed using mapping information gathered about each stored procedure that can be executed by a database server. The method comprises parsing an incoming transaction submitted by a client; determining whether the incoming transaction includes an invocation of a stored procedure; obtaining a query group corresponding to the stored procedure; applying an access control policy on the query group; and asserting an unauthorized event if the query group is not compliant with the access control policy.

16 Claims, 3 Drawing Sheets

U.S. PATENT DOCUMENTS

| | | | |
|---|---|---|---|
| 2008/0065640 A1 | 3/2008 | Shulman et al. | |
| 2008/0270455 A1* | 10/2008 | Bendel et al. | 707/102 |
| 2008/0320567 A1 | 12/2008 | Shulman et al. | |
| 2010/0251377 A1 | 9/2010 | Shulman et al. | |

OTHER PUBLICATIONS

Imperva SecureSpehre™ Data Security Solutions, Products, SecureSpere, http://web.archive.org/web/20060312093140/www.imperva.com/products/securesphere/, Imperva Inc, 2006, p. 1.

Imperva Inc., SecureSpehre™ Web Application Firewall The Industry's Only Automated Web Application Firewall, Products, Resources, Database, SecureSphere Web Application Firewall Datasheet, http://web.archive.org/web/20060312092739/www.imperva.com/products/securesphere/resources.asp, 2006, pp. 4.

Imperva Inc., Imperva SecureSpehre™ Dynamic Profiling Firewall, Product, SecureSphere, http://web.archive.org/web/20050207181514/www.imperva.com/products/securesphere/, 2005, pp. 2.

Imperva Inc., Imperva Delivers Unique Security Insight into Applications in Production, News & Events, Press Releases, New Release of SecureSphere Extends the Reach of Innovative Dynamic Profiling Technology, http://web.archive.org/web/20050207165342/www.imperva.com/company/news/2004-dec-13.html, Dec. 13, 2004, pp. 3, Foster City, California, USA.

Imperva Inc., Web and Database Firewalls, Products, SecureSpere™, Dynamic Profiling, http://web.archive.org/web/20041224083525/www.imperva.com/products/securesphere/web_database_firewalls.html, 2004, pp. 2.

Imperva Inc., Ready to take a test drive?, Products, SecureSpere™, Demo, http://web.archive.org/web/20041224085514/www.imperva.com/products/securesphere/demo.html, 2005, pp. 2.

Imperva Inc., Freeware IT security test tools, Application Defense Center, tools, http://web.archive.org/web/20041223174325/www.imperva.com/application_defense_center/tools.asp, 2005, p. 1.

Imperva Inc., Products, SecureSpehre™, White Papers, http://web.archive.org/web/20041224085413/www.imperva.com/products/securesphere/white_papers.asp, 2005, pp. 2.

Imperva Inc., Traditional Web Application Security vs. SecureSphere, A comparison of Hard Trigger Rules vs. Correlated Attack Validation, 2004, pp. 10.

Imperva Inc., Imperva™ SecureSphere™ Technical Description, 2004, pp. 20.

Imperva Inc., Imperva Unveils Next Generation Firewall Technology: Dynamic Profiling, SecureSphere 3.0 Delivers Total Application Security from Web, Worm and Database Threats, About Us, Press Releases, http://web.archive.org/web/20041015225044/www.imperva.com/company/news/2004-aug-23.html, Aug. 23, 2004, pp. 2, Foster City, California, USA.

Imperva Inc., Management & Reporting, http://web.archive.org/web/20041023204255/www.imperva.com/products/securesphere/management_reporting.html, Sep. 26, 2004, p. 1, vol. 3.0.

Imperva Inc., Imperva™ SecureSphere™ Securing the Enterprise Application Sphere, Apr. 1, 2004, pp. 2, vol. 2.0.

Imperva Inc., SecureSphere™ Dynamic Profiling Firewall Total Application Security, Products, SecureSphere™, Database, SecureSphere Datasheet, http://web.archive.org/web/20041215173241/www.imperva.com/products/securesphere/datasheet.html, 2004, pp. 4.

Imperva Inc., SecureSphere™ Dynamic Profiling Firewall Total Application Security, 2004, pp. 4.

Imperva Inc., Total Application Security with the SecureSphere Dynamic Profiling Firewall, http://www.infotechits.com/IT_Solutions/SecureSphere/securesphere_white_paper.pdf, 2004, pp. 1-10.

* cited by examiner

METHOD FOR MONITORING STORED PROCEDURES

CROSS REFERENCE TO RELATED APPLICATIONS

This application claims priority from a U.S. provisional application 60/844,096 filed on Sep. 13, 2006.

TECHNICAL FIELD

The disclosed teachings relate generally to monitoring a database system, and more particularly to controlling access to database tables.

BACKGROUND

The following U.S. patents and publications provide useful background information, for which they are incorporated herein by reference in their entirety.

| | | |
|---|---|---|
| 7,085,780 | August 2006 | Sakamoto, et al. |
| 7,082,455 | July 2006 | Hu, et al. |
| 6,769,074 | July 2004 | Vaitzblit |
| 6,507,834 | January 2003 | Kabra, et al. |
| 20060136493 | June 2006 | Muralidharan, et al. |
| 20040162822 | August 2004 | Papanyan, et al. |
| 20040162825 | August 2004 | Bhaghavan, et al. |

A stored procedure is a named group of SQL statements previously created and stored in a database server. Stored procedures accept input parameters so that a single procedure can be used over the network by several clients using different input data. Stored procedures reduce network traffic and improve performance. Additionally, stored procedures can be used to ensure the integrity of transactions. For example, the following stored procedure allows a user to get the inventory levels for a given warehouse:

CREATE PROCEDURE sp_GetInventory @location varchar(10) AS SELECT Product, Quantity FROM Inventory WHERE Warehouse=@location.

The stored procedure named "sp_GetInventory" includes the SQL statement:

"SELECT Product, Quantity FROM Inventory WHERE Warehouse=@location"

where the location is an input parameter. The database table accessed by this procedure is "Inventory" and the operation performed on this table is "SELECT". A user can retrieve inventory levels by providing the desired warehouse's location as an input to the procedure and issuing a command:

EXECUTE sp_GetInventory 'New-York'

For security of data and transaction integrity purposes it is desirable to monitor access to underlying tables in stored procedures and enforce access control on such tables. Related art techniques for monitoring tables that are accessed through stored procedures are based on a database internal audit trail mechanism. This introduces a major drawback as an attacker may take over the entire database or simply turn off the audit mechanism, and thus removing any traces of his activity. Another drawback is that such techniques generate many redundant records and events that need to be processed. For example, a stored procedure may include tens of operations to various tables. A single invocation of the stored procedure creates many access records that must be processed. As a result, the overall performance of a database system is reduced. Another drawback of related art techniques is the miscorrelation between procedure invocation and table access operations, i.e., a user (e.g., a system administrator) cannot correlate a suspicious access to a table to the invocation of a stored procedure. Thus, the user cannot detect the cause for an illegal access and take corrective actions. In addition, the audit based monitoring techniques cannot distinguish between an access made through a stored procedure, considered as an authorized access, and direct access to a table (e.g., by submitting a SQL statement) which is an unauthorized access.

In view of the shortcomings of related art techniques it would be advantageous to provide an efficient, effective and secure solution for monitoring stored procedures.

SUMMARY

To realize some of the advantages described above there is provided a method for monitoring activity and detecting unauthorized access to database tables through stored procedures, comprising parsing an incoming transaction submitted by a client. The method further comprises determining whether the incoming transaction includes an invocation of a stored procedure; obtaining a query group corresponding to the stored procedure; applying an access control policy on the query group; and asserting an unauthorized event if the query group is not compliant with the access control policy.

More specifically, upon asserting the unauthorized event, the transaction is blocked.

Even more specifically, the detection of an unauthorized access is performed inline and online by a secure gateway installed between the client and a database server.

In a specific implementation, the query group includes at least one pair of a table and an operation performed on the table.

In another specific implementation, the query group includes at least one privileged operation executed by the stored procedure.

In an enhanced implementation, the method further comprises distinguishing between transactions in which a table is directly accessed by the client and transactions in which a table is indirectly accessed using the stored procedure to access the table.

More specifically applying the access control policy on the query group further comprises applying on the query group at least one of correlation rules and audit rules associated with the client.

Even more specifically, the stored procedure may include at least one of: a user defined function, a database trigger, a database view.

Computer program products including a computer readable medium having software instructions to enable a computer to implement the above techniques are also within the scope of the disclosed teachings.

Another aspect of the disclosed teachings is a method for generating a query group for a stored procedure. The method comprises extracting from a data dictionary a list of tables having dependencies on the stored procedure; determining according to tables names if the tables exist in a source code of the stored procedure; for each table that exists in the source code extracting an operation code associated with the table; and saving the operation code in a query group of the respective stored procedure.

BRIEF DESCRIPTION OF THE DRAWINGS

The above objectives and advantages of the disclosed teachings will become more apparent by describing in detail preferred implementations thereof with reference to the attached drawings in which.

DETAILED DESCRIPTION

To overcome the shortcomings of related art techniques a method for monitoring stored procedures is disclosed. The method performs on-line and inline monitoring of stored procedures for detecting table access operations performed by the procedures. This allows the enforcing of access control policies, correlation rules and audit rules on stored procedures. The monitoring is performed using mapping information gathered about each stored procedure that can be executed by a database server.

Figure 1:
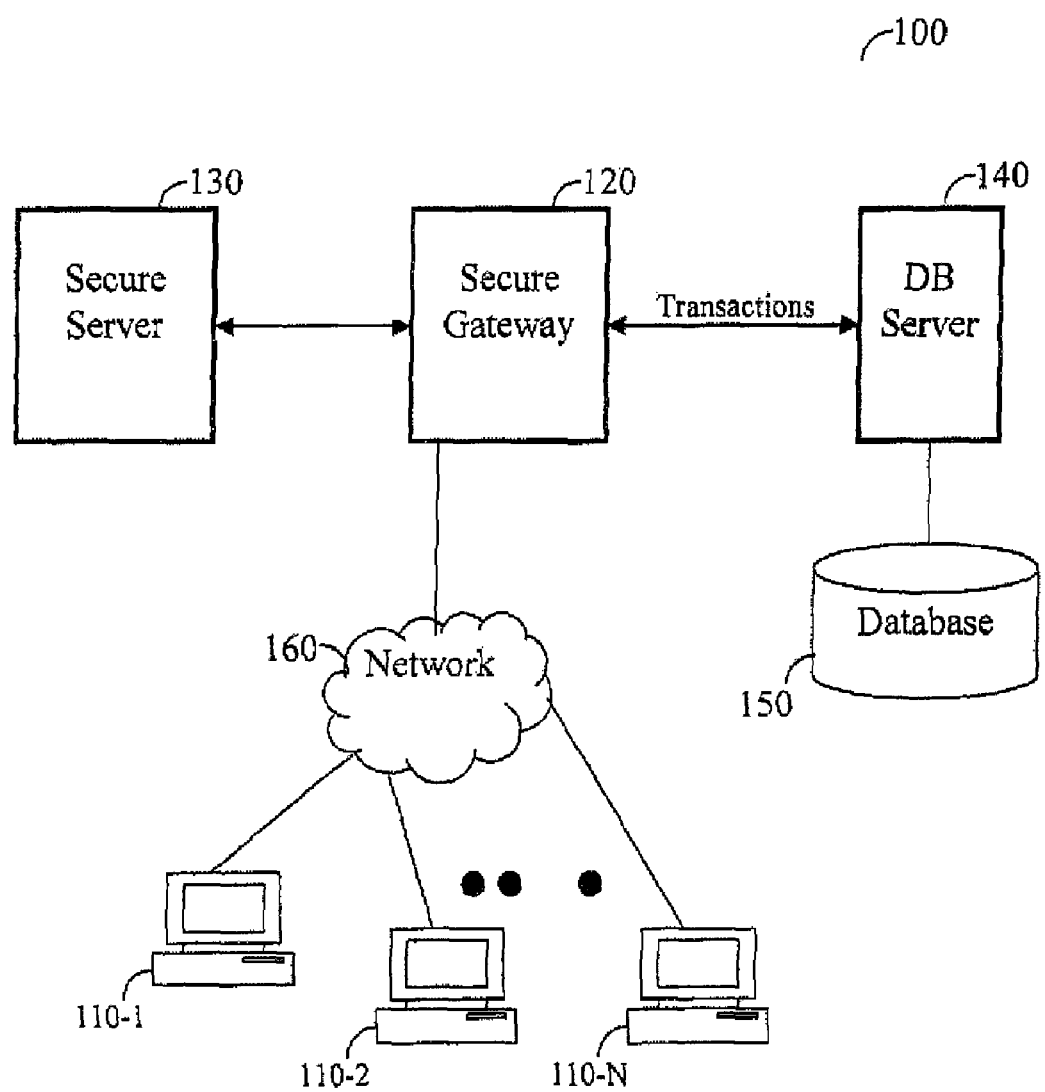
FIG. 1—is a block diagram of a secure database system used to describe aspects of the disclosed teachings.

FIG. 1 shows an exemplary and non-limiting block diagram of a secure database system 100 used to demonstrate the principles of the disclosed teachings. System 100 includes a plurality of clients 110-1 through 110-N, a secure gateway 120, a secure server 130, a database (DB) server 140, and a database 150. The secure gateway 120 and secure server 130 are enabled by the disclosed teachings. A client 110 submits a transaction to be executed by DB server 140 through a network 160, such as a local area network (LAN) or a wide area network (WAN). DB server 140 may be any computational node including a mechanism for servicing requests from a client 110 for computational or data storage resources. For example, DB server 140 may be one of Oracle Database Server, Microsoft SQL server, DB2, Sybase, and the likes. Database 150 may include any type of non-volatile storage and is directly coupled to DB server 140.

Secure gateway 120 is placed on a network segment between clients 110 and DB server 140. Secure gateway 120 collects and analyzes traffic (transactions) sent from clients 110 to DB server 140. This is performed to allow on-line and inline (as traffic flows from clients 110 to DB server 140) monitoring of stored procedures as well as table access operations performed by the procedures, and enforcing access control on the procedures. Specifically, gateway 120 is designed to identify, using mapping information generated by secure server 130, stored procedures in transactions flow from clients 110 to DB server 140 and distinguish between direct access to tables and access through stored procedures.

Figure 2:
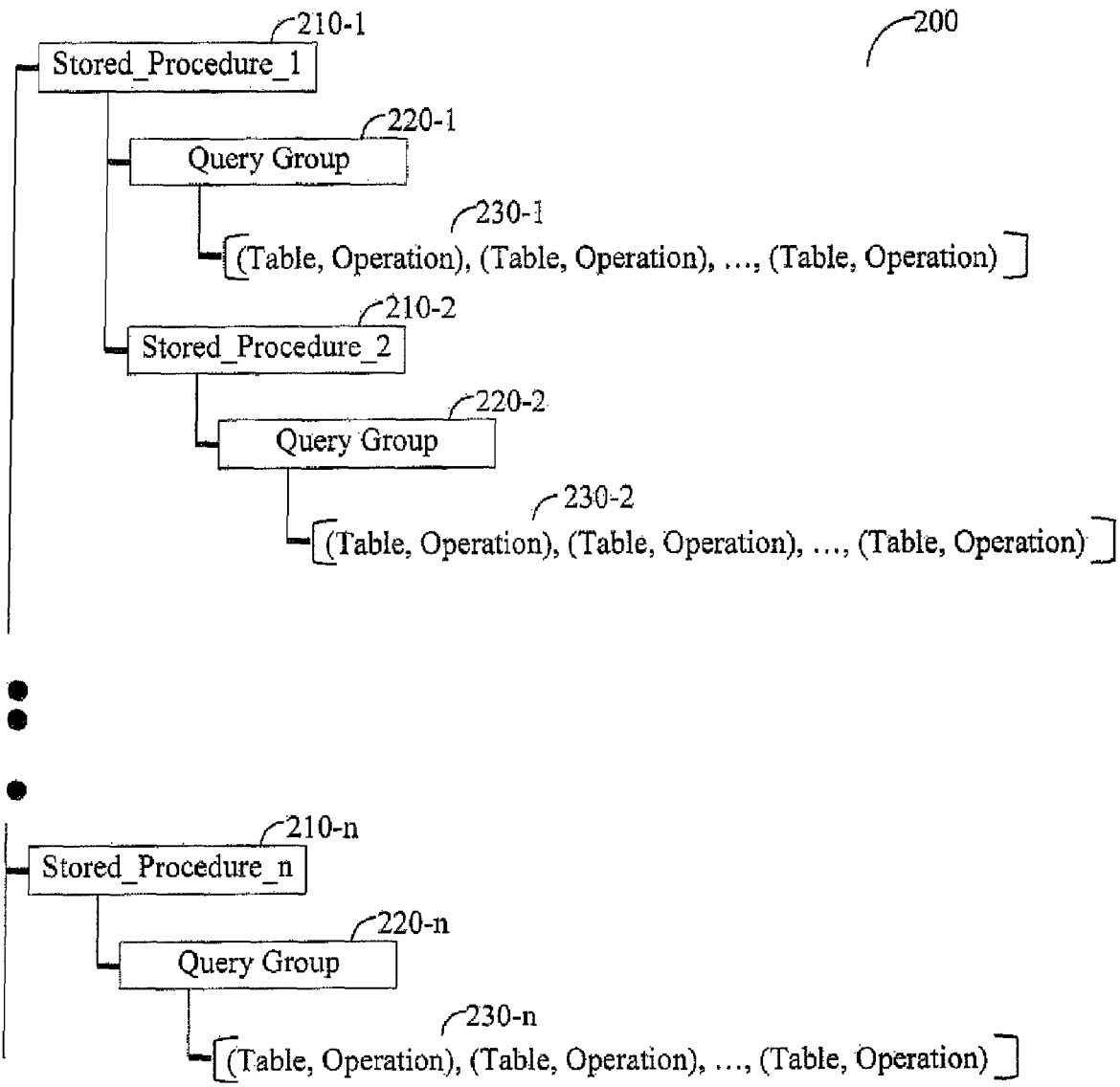
FIG. 2—is a schematic representation a data structure used to maintain mapping information.

FIG. 2 shows a schematic representation of a data structure 200 used to maintain the mapping information. Each stored procedure object 210 has a query group data structure 220 including a list of (table, operation) pairs 230. Each pair 230 consists of a table and an operation performed on that table. As an example, for the stored procedure "sp_GetInventory" shown above, the query group includes the pair (Inventory, SELECT). The mapping information may include query groups of stored procedures that invoked other stored procedures. This provides information about table access indirectly performed by stored procedures through other stored procedures. As shown in FIG. 2, the information is hierarchically organized indicating that stored procedure 210-2 is called by procedure 210-1 and a query group 220-2 belongs to stored procedure 210-2. The process for compiling the mapping information will be described in detail below. It should be noted that other exemplary implementations for representing the mapping information will be apparent to a person skilled in the art.

Secure gateway 120 applies a predefined access control policy on the query groups. An access control policy defines for each client 110 its respective allowed access to the database tables and how it may be done. If a query group extracted from a client's request is not compliant with the access control policy, secure gateway 120 may block the transaction. A query group may also be checked against correlation rules or audit rules. Secure gateway 120 may also block unauthorized operations resulting from direct access to database 150. The ability to distinguish between transactions in which a table is directly accessed by a client and transactions in which a table is indirectly accessed using a stored procedure to access the table provides an advantage over related art solutions and ensures both security of data and transaction integrity.

Figure 3:
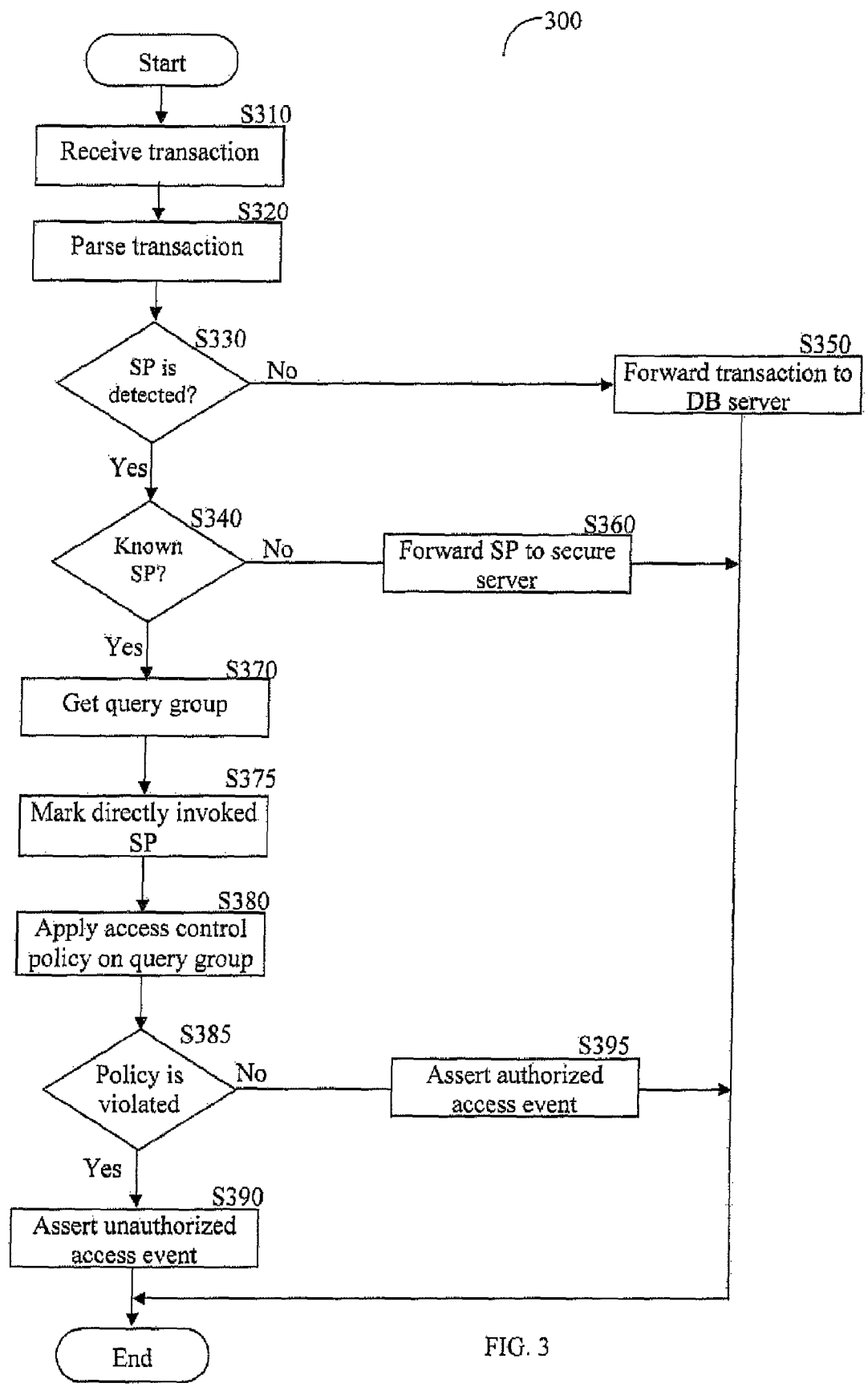
FIG. 3—is a flowchart describing a method for detecting unauthorized access to database tables made through stored procedures in accordance with an exemplary implementation of the disclosed teachings.

FIG. 3 shows an exemplary and non-limiting flowchart 300 describing the method for detecting an unauthorized access to database tables through stored procedures in accordance with an exemplary implementation of the disclosed teachings. At S310, a transaction from a client 110 is received at secure gateway 120. The transaction may be, but is not limited to in one of the following forms:

a) a text SQL query, e.g., SELECT Product FROM Inventory b) a SQL query that invokes a stored procedure, e.g., SELECT sp1 (Product) FROM Inventory, (sp1 is the procedure's name); or c) a command that invokes a stored procedure, e.g., EXECUTE sp_GetInventory At S320, the transaction is parsed to find a call to a stored procedure. At S330, a check is made to determine if such a call is detected, and if so, execution continues with S340; otherwise, at S350 the transaction (including a text SQL query) is forwarded to DB server 140.

At S340 another check is made to determine if the detected procedure is a known procedure, i.e., if secure server 130 generated a query group for this procedure. Unknown stored procedures are sent, at S360, to secure server 130 for learning purposes. At S370, respective query groups of "known procedures" are retrieved using their procedure names. Secure gateway 120 holds a query group for each stored procedure that may be executed by DB server 140. At S375 a query group of a SQL query that invokes a stored procedure (e.g., SELECT sp1 (Product) FROM Inventory) is generated by retrieving the respective query group of the invoked procedure (e.g., sp1) and adding pairs of tables and operations directly performed by the SQL query, e.g., (Inventory, SELECT). The query group of the stored procedure is invoked using vendor specific procedures. For example, with Oracle database a combination of automatic code inspection and data dictionary information are used for this purpose. With MS SQL, Sybase and DB2 the execution plan information is utilized. The generated query group is marked to distinguish between tables that are directly accessed by the SQL query and tables accessed implicitly through a stored procedure. For example, a stored procedure named "validate_user" with a parameter "param1" that contains the statement "SELECT id FROM users where user_id=param1" is identified. The query group of this stored procedure is (users, SELECT). If a query inspected on the network that invokes a stored procedure such as "execute validate_user('myname')" then the query group (users, SELECT) is implicit as it does not explicitly appear in the query, but rather implied by the use of the stored procedure. At S380, the query group is checked against one or more access control policies, correlation rules, and audit rules associated with the client that submitted the transaction. For example, these checks may include, but are not limited to checking if the user is authorized to directly access the tables, if the combination of the tables and operations in the query group are permitted by the access control policy, and so on. At S385, it is determined if one of the checks does not pass, and if so execution continues with S390 where an event is asserted indicating an unauthorized access and consequently secure gateway 120 may block the transaction from being executed by DB server 140. Otherwise, at S395, an event is generated authorizing the transaction.

An exemplary implementation according to the disclosed teachings automatically generates a query group for each stored procedure defined in DB server 140 and regardless of the type of the DB server. In accordance with an exemplary implementation, secure server 130 detects the accessed tables and operations performed on these tables using an execution plan (or an Explain Plan). An execution plan is a report that depicts how DB server 140 plans to execute a given SQL query or a stored procedure and how to retrieve requested data. Generally, the plan contains information about the objects involved in the execution of procedures, operations to be performed on each of the objects, the order of operations, and information about performance time and CPU utilization. To this end, secure server 130 sets a connection with DB server 140 to run the execution plan on all stored procedures in DB server 140. Thereafter, secure server 130 analyzes the report generated by the execution plan to build query groups. That is, for each stored procedure, each operation and table access are extracted from the report and saved as a pair (table, operation) in a query group. This implementation is mainly designed for databases that support execution plans for stored procedures, e.g., DB2, Microsoft SQL server, and Sybase.

In accordance with another exemplary implementation of the disclosed teachings, secure server 130 produces query groups by analyzing the source code of procedures stored in DB server 140 and correlating the code with information from the data dictionary of the database. Specifically, secure server 130 extracts from the data dictionary a list of dependencies for the stored procedure (i.e., list of tables on which the stored procedure depends for its correct functioning) and then searches for these table names in the source code. Once a table is detected in the source code, secure server 130 extracts the operation associated with that specific table in the code. This information is saved in a query group of the respective procedure. This exemplary implementation is mainly designed for databases that do not support execution plans for stored procedures, such as Oracle. It should be noted that in both implementations, query groups can be created to support recursive stored procedures (i.e., stored procedures that invoke other stored procedures).

Secure server 130 frequently updates all query groups that it maintains. For this purpose, secure server 130 periodically monitors DB server 140 to determine if any stored procedures were added. If a new procedure is found, secure server 130 analyses the procedure and builds its query group by extracting tables and table operations from the stored procedure source code for creating the procedure (example, for such code is provided above). Secure server 130 further analyses unknown procedures, reported by secure gateway 120, and generates query groups for these procedures. In addition, secure gateway 120 may detect a command for creating a stored procedure (e.g., CREATE PROCEDURE sp_GetInventory) and provide secure server 130 with the creation code of the procedure. Secure server 130, at its turn, may generate the query group from this code.

It will be appreciated by a person skilled in the art that although in the above-described exemplary implementations, secure gateway 120 monitors access to database tables through stored procedures, gateway 120 may also monitor access made through user defined functions, database views, database triggers, and any other executable code executed by DB server 140 for accessing database tables. In addition, secure gateway 120 may handle all privileged operation (i.e., an operation that affects the structure of the database) performed by stored procedures (e.g., create table, create user, and so on) as well as dynamic SQL statements (e.g., execute immediate, sp_execsql, and so on). It would be further understood that the specific system implementation is provided as a mere example and other implementations employing the principles of the disclosed teachings may be created, and are specifically included herein.

It should be noted to a person skilled in the art that methods, processes and systems described herein can be implemented in software, hardware, firmware, or combination thereof. The implementation may be performed as well using a computer system having a processor and a memory under control of the processor, the memory storing instructions adapted to enable the processor to carry out operations as described above. The implementation may be realized, in a concrete manner, as a computer program product that includes a tangible computer readable medium holding instructions adapted to enable a computer system to perform the operations as described above. It should be noted that the computer-readable media could be any media from which a computer can receive instructions, including but not limited to hard disks, RAMs, ROMs, CDs, magnetic tape, internet downloads, carrier wave with signals, etc. Also instructions can be in any form including source code, object code, executable code, and in any language including higher level, assembly and machine languages. The computer system is not limited to any type of computer. It could be implemented in a stand-alone machine or implemented in a distributed fashion, including over the internet While the present invention has been particularly shown and described with reference to exemplary implementations thereof, it will be understood by those of ordinary skill in the art that various changes in form and details may be made therein without departing from the spirit and scope of the present invention as defined by the following claims.

What is claimed is:

1. A method for monitoring activity and detecting unauthorized access to database tables, the method comprising:
   parsing an incoming transaction submitted by a client;
   determining whether the incoming transaction includes an invocation of a stored procedure;
   obtaining a query group data structure corresponding to the stored procedure;
   applying an access control policy on the query group data structure; and
   asserting an unauthorized event if the query group data structure is not compliant with the access control policy;
   wherein the access to database tables is indirectly performed using the stored procedure.

2. The method of claim 1, further comprising:
   upon asserting the unauthorized event, blocking the transaction.

3. The method of claim 2, wherein the detection of an unauthorized access is performed inline and online by a secure gateway installed between the client and a database server.

4. The method of claim 3, wherein the query group data structure includes at least one pair of a table and an operation performed on the table.

5. The method of claim 3, wherein the query group data structure includes at least one privileged operation executed by the stored procedure.

6. The method of claim 5, further comprising: distinguishing between transactions in which a table is directly accessed by the client and transactions in which a table is indirectly accessed using the stored procedure to access the table.

7. The method of claim 6, wherein applying the access control policy on the query group further comprising: applying on the query group data structure at least one of correlation rules and audit rules associated with the client.

8. method of claim 7, wherein the stored procedure includes at least one of: a user defined function, a database trigger, a database view.

9. A computer program product for monitoring activity and detecting unauthorized access to database tables, the computer program product having computer instructions on a tangible computer readable medium, the instructions being adapted to enable a computer system to perform operations comprising:
   parsing an incoming transaction submitted by a client;
   determining whether the incoming transaction includes an invocation of a stored procedure;
   obtaining a query group data structure corresponding to the stored procedure;
   applying an access control policy on the query group data structure; and
   asserting an unauthorized event if the query group data structure is not compliant with the access control policy;
   wherein the access to database tables is indirectly performed using the stored procedure.

10. The computer program product of claim 9, further comprising:
    upon asserting the unauthorized event, blocking the transaction.

11. The computer program product of claim 10, wherein the detection of an unauthorized access is performed inline and online by a secure gateway installed between the client and a database server.

12. The computer program product of claim 11, wherein the query group data structure includes at least one pair of a table and an operation performed on the table.

13. The computer program product of claim 11, wherein the query group data structure includes at least one privileged operation executed by the stored procedure.

14. The computer program product of claim 13, further comprising:
    distinguishing between transactions in which a table is directly accessed by the client and transactions in which a table is indirectly accessed using a stored procedure to access the table.

15. The computer program product of claim 14, wherein applying the access control policy on the query group further comprising:
    applying on the query group data structure at least one of correlation rules and audit rules associated with the client.

16. The computer program product of claim 15, wherein the stored procedure includes at least one of: a user defined function, a database trigger, a database view.

* * * * *